(12) United States Patent
Carroll et al.

(10) Patent No.: US 6,509,659 B1
(45) Date of Patent: Jan. 21, 2003

(54) CABLE OR MODULE IDENTIFICATION APPARATUS AND METHOD

(75) Inventors: Chason Carroll, Dacula, GA (US); Martin Ramsden, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/999,839

(22) Filed: Oct. 24, 2001

(51) Int. Cl.$^7$ ............................................. H01M 10/46
(52) U.S. Cl. ...................... 307/125; 439/955; 324/66; 320/106; 455/559
(58) Field of Search ........................ 307/125; 439/955; 324/66; 320/106, 107; 379/446, 454; 455/557, 559

(56) References Cited

U.S. PATENT DOCUMENTS

| | | | |
|---|---|---|---|
| 3,414,806 A | * 12/1968 | Carr | 324/66 |
| 4,006,396 A | 2/1977 | Bogut | |
| 4,468,612 A | * 8/1984 | Starr | 439/955 |
| 5,181,858 A | * 1/1993 | Matz et al. | 439/955 |
| 5,184,059 A | 2/1993 | Patino et al. | |
| 5,254,931 A | * 10/1993 | Martensson | 320/160 |
| 5,264,958 A | * 11/1993 | Johnson | 710/315 |
| 5,330,370 A | * 7/1994 | Reddersen et al. | 439/955 |
| 5,359,540 A | * 10/1994 | Ortiz | 307/115 |
| 5,367,563 A | * 11/1994 | Sainton | 379/93.05 |
| 5,491,418 A | * 2/1996 | Alfaro et al. | 439/955 |
| 5,535,274 A | * 7/1996 | Braitberg et al. | 379/446 |
| 5,649,001 A | * 7/1997 | Thomas et al. | 379/93.07 |
| 5,668,419 A | * 9/1997 | Oktay | 307/125 |
| 5,742,273 A | * 4/1998 | Flinders et al. | 345/204 |
| 5,783,926 A | * 7/1998 | Moon et al. | 320/106 |
| 5,818,197 A | * 10/1998 | Miller et al. | 320/107 |
| 5,822,427 A | 10/1998 | Brantberg et al. | |
| 5,836,785 A | * 11/1998 | Lee | 439/955 |
| 5,859,522 A | * 1/1999 | Theobald | 320/106 |
| 5,870,615 A | * 2/1999 | Bar-On et al. | 320/106 |
| 5,934,610 A | * 8/1999 | Karolys et al. | 244/1 R |
| 6,059,583 A | * 5/2000 | Croft et al. | 439/131 |
| 6,064,177 A | * 5/2000 | Dixon | 320/107 |
| 6,088,754 A | * 7/2000 | Chapman | 710/100 |
| 6,138,182 A | * 10/2000 | Hennessy et al. | 710/16 |
| 6,349,228 B1 | * 2/2002 | Kiani et al. | 439/909 |
| 6,377,825 B1 | * 4/2002 | Kennedy et al. | 455/557 |

OTHER PUBLICATIONS

"Cable Identification Means Using Active Circuitry for Data Communications Signal Cables", Oct. 1989, IBM Technical Disclosure Bulletin, vol. 52, Issue 5A, pp. 59–61.*

* cited by examiner

Primary Examiner—Brian Sircus
Assistant Examiner—Roberto J. Rios
(74) Attorney, Agent, or Firm—Philip H. Burrus, IV

(57) ABSTRACT

This invention includes a universal base unit having a plurality of cables, each corresponding to a unique electronic host device. The cable is manufactured such that the ground connection of the electronic host device is routed to one of a plurality of identification pins. In one embodiment, the identification pins are coupled to a plurality of current sense resistors. When the cable is coupled serially between the electronic device and the universal base unit, the universal base unit identifies the unique electronic device by sensing which resistor is connected to the ground of the electronic host. In another embodiment, pull-up resistors are used instead of current sense resistors. The system allows a user to carry a single power supply or universal base unit with multiple cables as opposed to having to transport a different accessory for each electronic device.

8 Claims, 8 Drawing Sheets

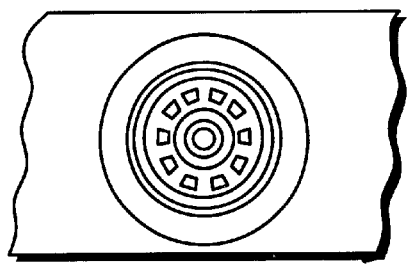
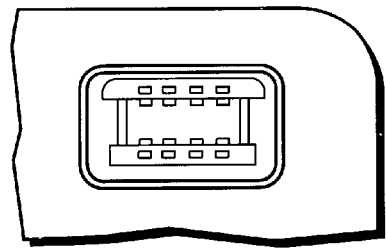
*FIG. 3A*  *FIG. 3B*
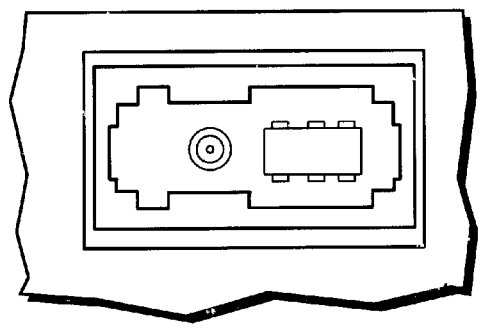
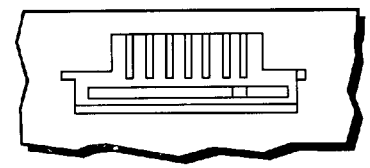
*FIG. 3C*  *FIG. 3D*
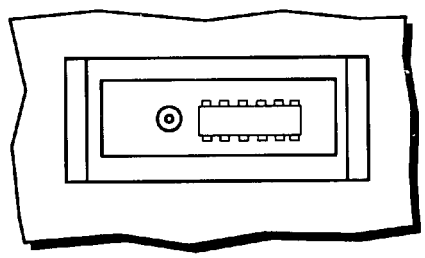
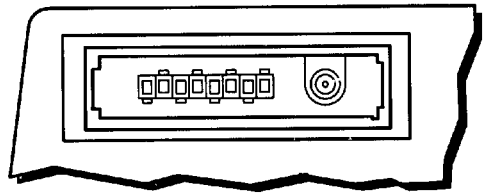
*FIG. 3E*  *FIG. 3F*

CABLE OR MODULE IDENTIFICATION APPARATUS AND METHOD

BACKGROUND

1. Technical Field

This invention relates generally to interfacing systems for portable electronic devices, and more particularly to an apparatus for providing a power and communications interface between a portable electronic device, selected from a variety of such devices, to a common base unit.

2. Background Art

Electronic devices are being developed today at a dizzying rate. Everywhere you look, people are carrying cellular phones, compact disc (CD) players, personal digital assistants (PDAs), pagers, radios, MP3 players, and laptop computers. This proliferation of electronic devices is especially true in the case of cellular telephones. According to the Cellular Telecommunications Industry Association (CTIA), cellular telephone usage in the United States increased 27% between 1999 and 2000. As of December 2000, there were over 109 million cellular subscribers in the United States alone.

There are two problems with this proliferation of electronic devices, however: First, they seem to all use different power supplies with different connectors. Nothing is more frustrating than packing for a trip and having to leave your swimming suit at home because your suitcase is full with four different power supplies for your computer, PDA, phone and CD player.

There is a reason for the various power supplies and connectors. Each host device has different power requirements. For example, a laptop computer consumes much more energy than does a cellular phone. The extra power is needed to run motors like disk drives and CD-ROM players that the phone does not have. Additionally, the laptop may have to illuminate a 120 square inch screen continuously, while the cellular phone need only light a 4 square inch screen occasionally.

Another reason for the differing power supplies are the batteries associated with each device. Different rechargeable batteries have differing charging requirements. For example, a nickel-metal hydride battery may charge to a termination of 6 volts, while a single-cell Lithium-Ion battery can only be charged to 4.2 volts. If the lithium battery were charged with a nickel charger, the lithium battery could become "overcharged" when the voltage exceeded 4.2 volts. Under these conditions, the reliability of lithium cells can be compromised.

The second problem is that as the sophistication of electronic devices increases, data ports to and from the electronic devices are required to transmit data for remote antenna connections, voice and data communications, and most importantly, what is known as "hands free" operation. These functions generally require a physical connection between the phone unit and parts or devices found in a vehicle or accessory. These data ports are typically seem to be manufacturer specific—each manufacturer has it's own unique connector.

The two problems are essentially the same: every portable device has a unique connector for power and data. Designing a "universal" device to work with a plurality of devices is thus problematic.

One solution to the "multiple-device, multiple-accessory" problem is the multi-connector. Referring to FIG. 1, illustrated therein is a multi-prong adaptor 5 commonly available at electronics stores. Such an adapter 5 generally has several different prongs 1,2,3 coupled in parallel to a power cord 4. The power cord 4 may thus be connected to three different types of connectors. The problem with such a device is that the power delivered by the supply is the same no matter what connection you are using. If the power supply is a 6-volt supply, you still cannot charge a single-cell lithium battery with this connector (even if it does fit) because the battery performance may be compromised. Additionally, these connectors generally have no provisions for data communication.

Another possible solution made specifically for cellular phones is the car kit. Cellular phone manufacturers have made available car kits to provide both charging and data communication, as well as hands-free operation. These kits include physical hardware to retain the phone in the vehicle including an attachment for establishing an electrical connection to the phone and various types of remote speakers, microphones, power supplies and antenna connections. These kits also include complex electronics modules to provide battery charging, audio amplification and digital communication interface to the phone unit.

The problem with these car kits is that they are device specific. In other words, you cannot use a Nokia accessory with a Motorola phone. As a result, car kits do not provide any form of universal connection and are neither physically nor electrically interchangeable. Additionally, device specific car kits can be expensive, with costs of the accessory rivaling the cost of the phone itself.

This situation has caused a hardship on cellular telephone users and affected the marketplace for new equipment. Fleet users, for example, cannot provide a universal car kit connection for the variety of phones they may acquire. Users are forced to abandon their investment in the car kit when purchasing new models of telephones. These limitations have prevented businesses such as car rental agencies from providing users with means to use their car phones in rented vehicles. Further, the high cost of these car kits has caused many users to operate hand-held units while driving, an unsafe condition which is subject to increasing governmental concern and regulation.

There is thus a need for an improved interface system capable of coupling to and identifying a plurality of portable electronic devices.

BRIEF DESCRIPTION OF THE DRAWINGS

FIGS. 3A–3F show examples of a variety of hand-held cellular telephone input/output physical interfaces.

DETAILED DESCRIPTION OF THE INVENTION

Figure 1:
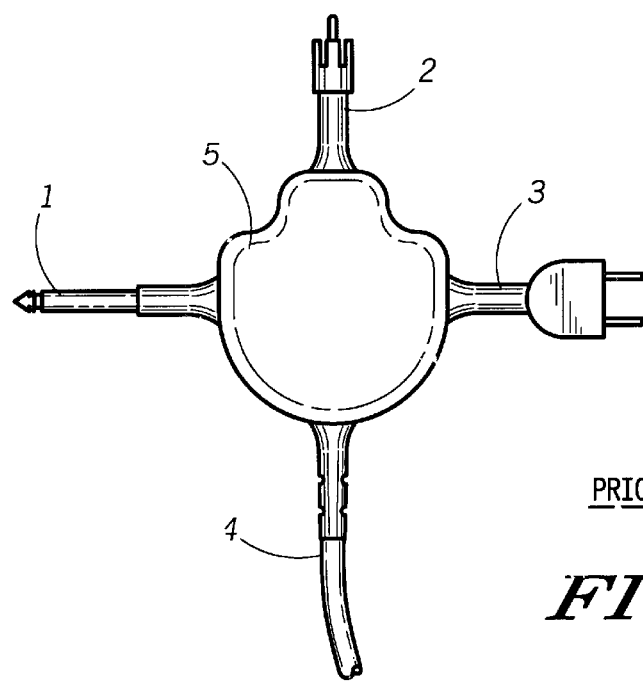
FIG. 1 is a prior art multiple-terminal connector.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
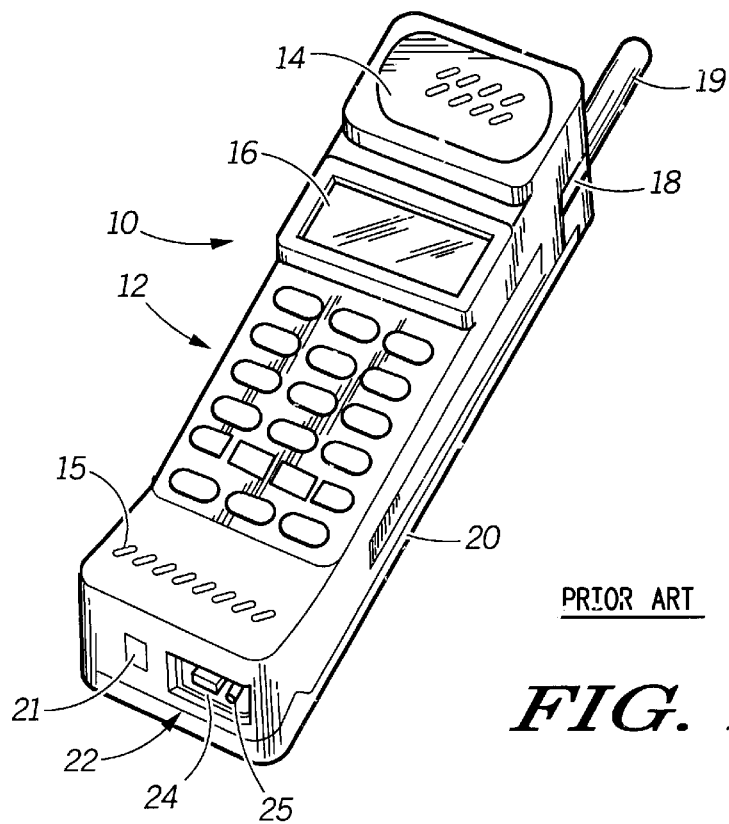
FIG. 2 shows a contemporary cellular telephone and its interconnection port.

Referring now to FIG. 2, illustrated therein is one embodiment of a conventional hand held cellular telephone 10. Such telephones 10 employ a wide variety of physical interfaces. There are a large number of models of cellular telephones in existence and each physical interconnection and electrical interface is unique to a manufacturers specific model.

Cellular phone 10 includes a typical array of features for such devices. Keypad 12 allows dialing and other data processing/generating functions. An earphone 14 is positioned at one end while a microphone/speaker 15 is located at the other end. Liquid crystal display (LCD) 16 provides a compact presentation of limited information to the user while switch 18 is for on/off control. Antenna 19, which may be either internal or external, communicates with the tower infrastructure when the phone 10 is in transmission. A battery pack 20 is attached to the phone 10 and requires periodic recharging when phone 10 is coupled to a charger or power supply. Some phones 10 include a release button 21 for decoupling from accessories.

Accessories are connected to the phone 10 by a plug 22 at one end of the phone 10. The particular connector of FIG. 2 is a male connection with a center extension 24 having arrays of electrical contacts on the upper and lower surfaces thereof. Additionally, an RF coaxial type element 25 is included as a portion of plug 22. Note that not every cellular telephone has an RF connector even though one is included in the example shown as element 25. In conventional use, the phone 10 may be stored in a desktop charger so as to couple plug 22 with a complementary connector in the charger.

FIGS. 3A through 3F show a series of examples of physical interconnections for cellular telephones. That is, FIGS. 3A to 3F present typical examples of cylindrical, rectangular, spring contact and pad type connections used in common cellular phone units, usually in the base plate thereof. From this, it is apparent the wide range of configurations and physical sizes prohibits a common interconnection to a base unit or the like. Cellular phones are expected to use even smaller connectors as the units are further miniaturized in the future.

Figure 4:
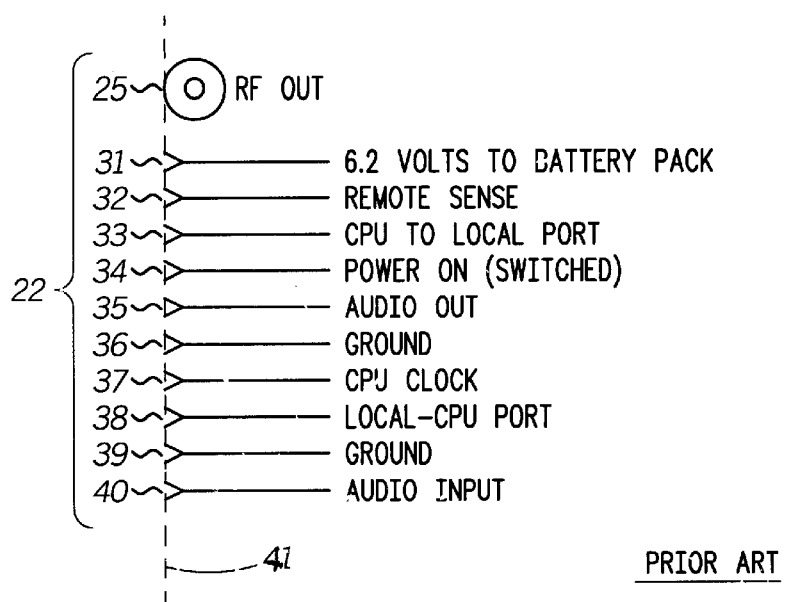
FIG. 4, is a tabulation of the electrical functions associated with a typical input/output connector for a contemporary cellular telephone.
Figure 5:
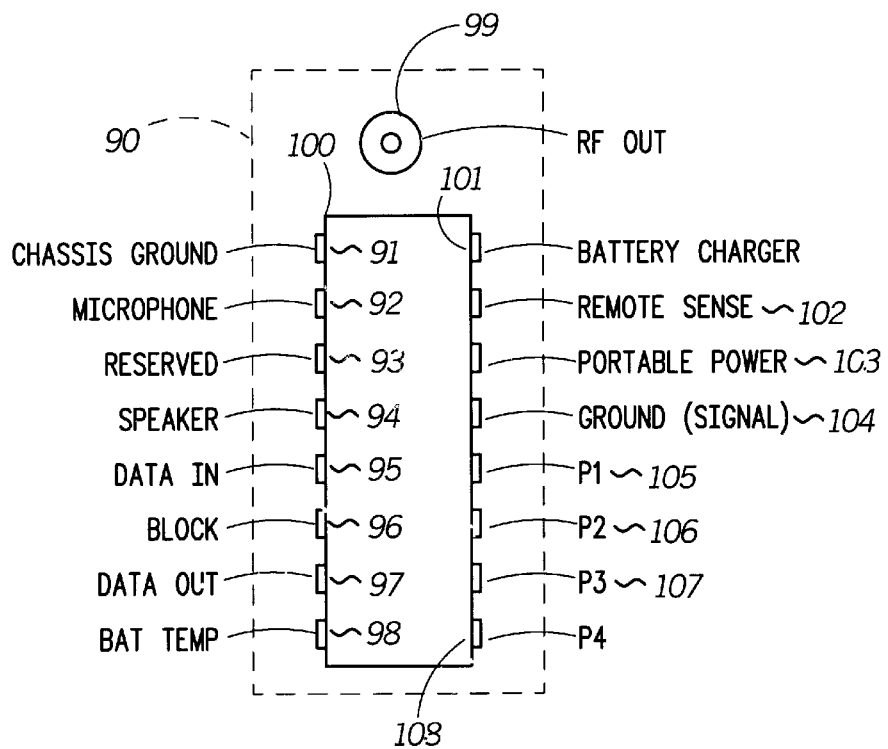
FIG. 5 is a tabulation of an exemplary connection assignment discipline associated with a typical input/output connector for a contemporary cellular telephone.

Electrical interfaces to the various phone units present still more problems. For instance, as stated, there are a wide variety of battery types and voltages used in the rechargeable battery packs incorporated into the phone units. Further, the electrical phone signals exist in a wide variety of voltage levels and signal coding schemes. Referring now to FIG. 4, a typical example of the functions assigned to the pins of a conventional phone input/output connector 22 containing connector contacts or pins 31–40 is shown. Note that connector, 22 might or might not represent the specific pin function assignments for connector 22 shown in FIG. 2. While there is a certain amount of commonality of functions associated with many cellular phones, the particular function assigned to a given pin often varies, as does the number of functions, the number of pins and their physical configurations.

Connector 22 is shown with a coaxial connector 25 to provide for direct connection to the RF output. Pin 31 is used for battery charging from the remote adapter, while pin 32 is used to detect the presence of the remote adapter and pin 33 is used for digital communication to the remote adapter. Pin 34 is used to signal the remote adapter that phone power is on. Pin 35 has the low level audio output signal to drive a remote speaker amplifier. Pins 36 and 39 provide internal ground connections. Pin 37 provides the CPU clock signal, pin 38 is the local to CPU communications port, and pin 40 is used to receive the signal from the remote microphone.

Figure 6:
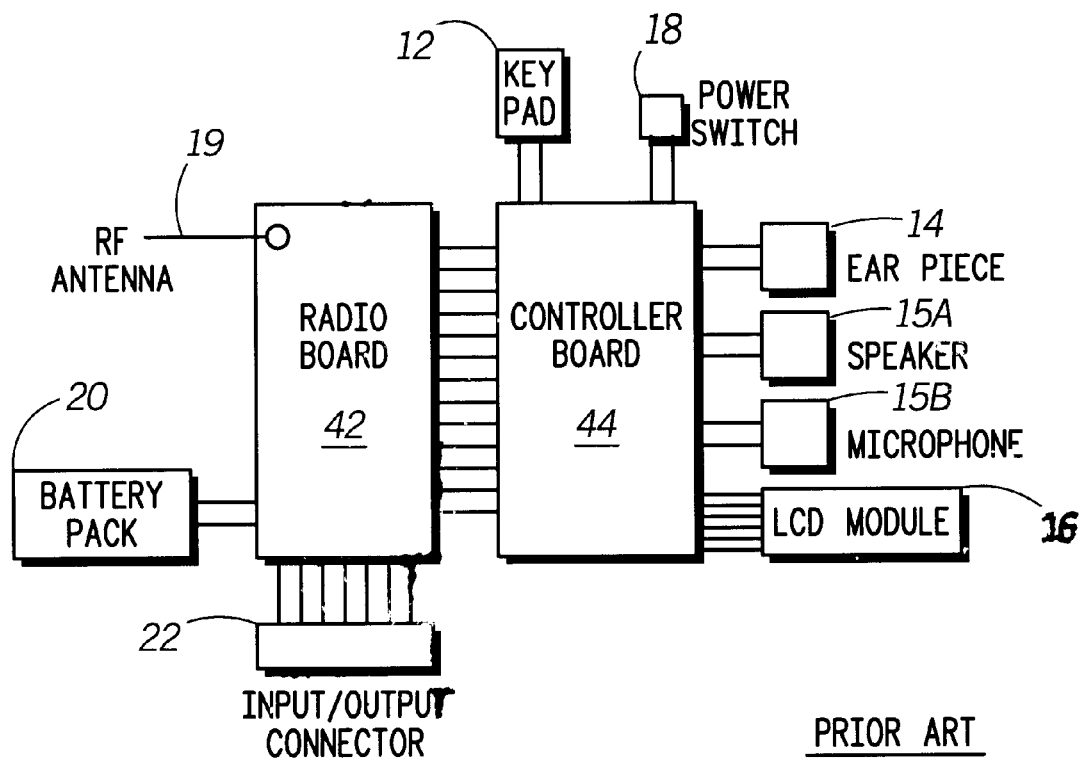
FIG. 6 is a block diagram of a typical hand-held cellular phone unit.

The internal architecture of a typical phone unit is shown in block diagram form in FIG. 6 where further details of the interconnections with the internal block functions of the phone with the input/output connector 22 described above are presented. The peripheral elements of FIG. 6 correspond to their counterparts of FIG. 2. Note that the speaker 15A is separate from the microphone 15B but both are housed at that end of unit 10. This is to prevent production of the ringing sound directly into the ear of the user. Radio board 42 contains the radio frequency signal handling components whereas a computer including a conventional CPU with its input/output interfaces is contained in board 44. The CPU of board 44 handles all the host functions associated with the components shown.

Figure 7:
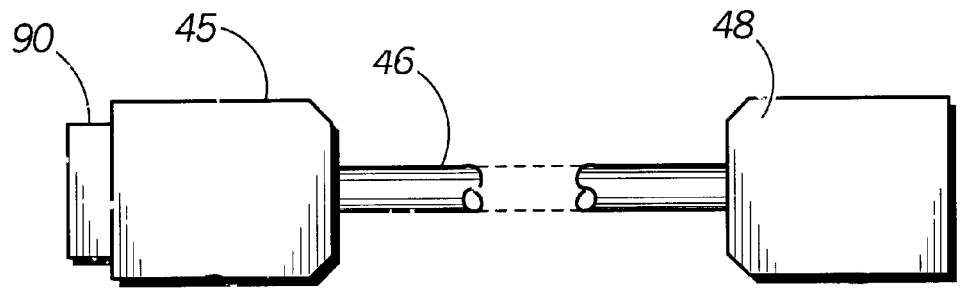
FIG. 7 is a cable assembly for coupling accessories to electronic devices.

It is possible to create a custom tailored adapter cable configured internally to transpose connections between the various interconnection disciplines along the lines of those shown in FIG. 3. It has long been known in the art that cables may be manufactured with connectors of different types as illustrated in FIG. 7. Referring now to FIG. 7, illustrated therein is a cable 46 with different connectors 45,48 on each end. A universal connector 45 or plug is arranged in accordance with a predetermined assignment of pin functions. On the opposite end of cable 46 is a connector or plug 48 configured to attach to a particular electronic device. That is, connector 48 is different for each differently configured connector on a cellular phone. The conductors within cable 46 are connected within plugs 45 and 48 so that the pin functions are matched.

The problem with such a cable 46 linking a specific electronic device and a universal base unit is that the universal base unit must be able to identify just what specific device is attached at the other end. One object of this invention is an apparatus and method for identifying an electronic device via a cable having a universal connector on one end and a device specific connector on the other. This invention has numerous advantages over the prior art, including simpler implementation with control units and microprocessors, reduced cost, increased breadth, and expanded flexibility. These advantages will be discussed in more detail below. First it is well to examine the prior art.

Figure 8A:
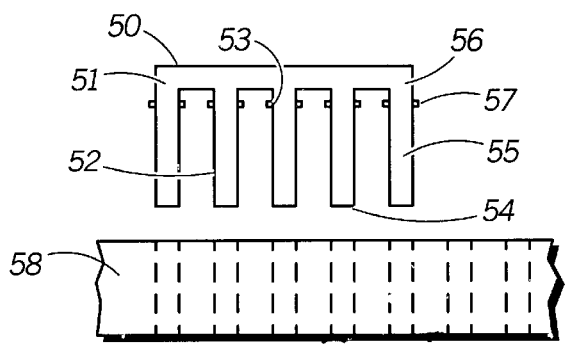
FIGS. 8A–8D illustrate a prior art method of embodying a coded adapter cable connector.
Figure 8B:
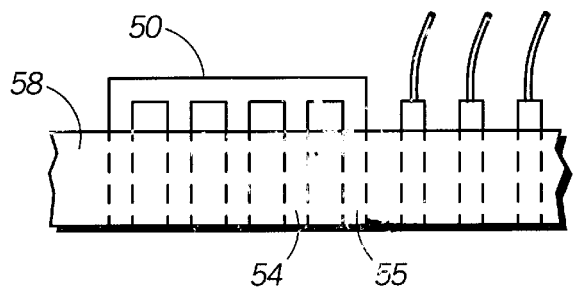

One solution to the "identification issue" is taught by U.S. Pat. No. 5,822,427, issued to Braitberg et al. Referring now to FIGS. 8A–8D, illustrated therein is the Braitberg et al. solution for determining the make and model of an electronic device coupled at the end of a cable. This solution utilizes the cable adapter to identify itself to a universal base unit. This is accomplished by a number of pins reserved at the processor or common end of the cable connector for use as a programming device. An electrically conductive structure 50 containing a plurality of physically and electrically interconnected pins 51–55 is inserted into and retained by connector body 58 as seen in FIG. 8B. A short connecting link 56 extends above ridge or shoulder 57 above the connector body 58 when connector 50 is inserted therein. These links are preferably clipped in a binary pattern to produce the identification data for the processor 154 so that it can determine the type of cellular phone attached to the other end of the cable.

Figure 8C:
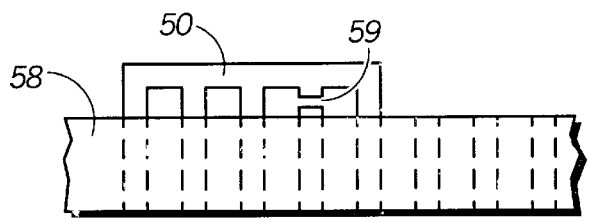
Figure 8D:
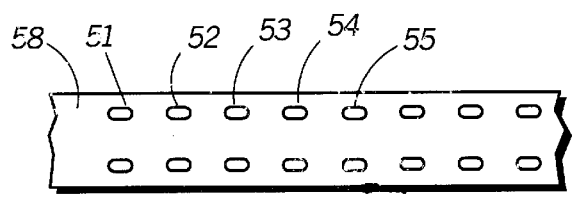

For example, if link 54 is clipped as shown as gap 59 in FIG. 8C, the resulting circuit to pin 54 is opened. Thus electrical current sensing of the pins 51–55 in FIG. 8D will reflect the open circuit status of pin 54. The connector body 58 includes conventional, well-known means (not shown) for retaining the end of the clipped contact in place so as to prevent it from falling out or sliding back into the connector body when the connectors are coupled.

The problem with this solution is that a binary jumper must be inserted into the connector during manufacture. Not only does an additional part increase the mean time between failures (MTBF), but it also adds manufacturing costs.

Braitberg et al. teaches other solutions, including a memory device being stored in the cable, as is taught in copending application Ser. No. 09/730,691, filed Dec. 6, 2000, assigned to Motorola, Inc. Again, this solution can be expensive and difficult to manufacture. Semiconductor devices are quite costly and difficult to assemble in connector housings and cables. Such manufacture typically requires hand soldering, which increases labor costs as well as material costs.

Figure 9:
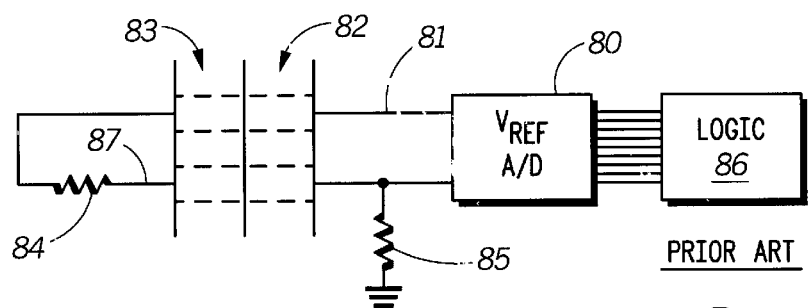
FIG. 9 is a prior art block diagram of a battery characteristic detector.

Braitberg et al. teaches yet another solution, as illustrated in FIG. 9. In this embodiment, analog to digital (A/D) converter 80 provides a reference voltage (Vref) to line 81 that is presented to the mating connector pins 82 and 83. The voltage produces a current through the circuit consisting of resistor 84 (Rprog) and resistor 85 (Rfixed) in a half-bridge configuration providing a voltage at pin 87 which is connected to the signal input of A/D converter 80. A 6 bit A/D converter can provide 64 possible binary codes to logic 86. The value for each Rprog resistor 84 is calculated from the equation: Vout*Rfixed/(Vref−Vout).

This particular solution is a extremely similar on a resistor-based identification scheme first disclosed by Bogut in U.S. Pat. No. 4,006,396, issued in 1977, entitled "Universal Battery Charging Apparatus", assigned to Motorola, Inc. The problem with the solution of Braitberg et al. is that it can also be costly and cumbersome. The Braitberg et al. solution requires a dedicated analog to digital (A/D) converter, dedicated voltage reference and two resistors. These components can be as expensive as microprocessors. Additionally, to accommodate a wide variety of phones, both the voltage reference and the resistors must be precision components, which further adds to the cost.

Figure 10:
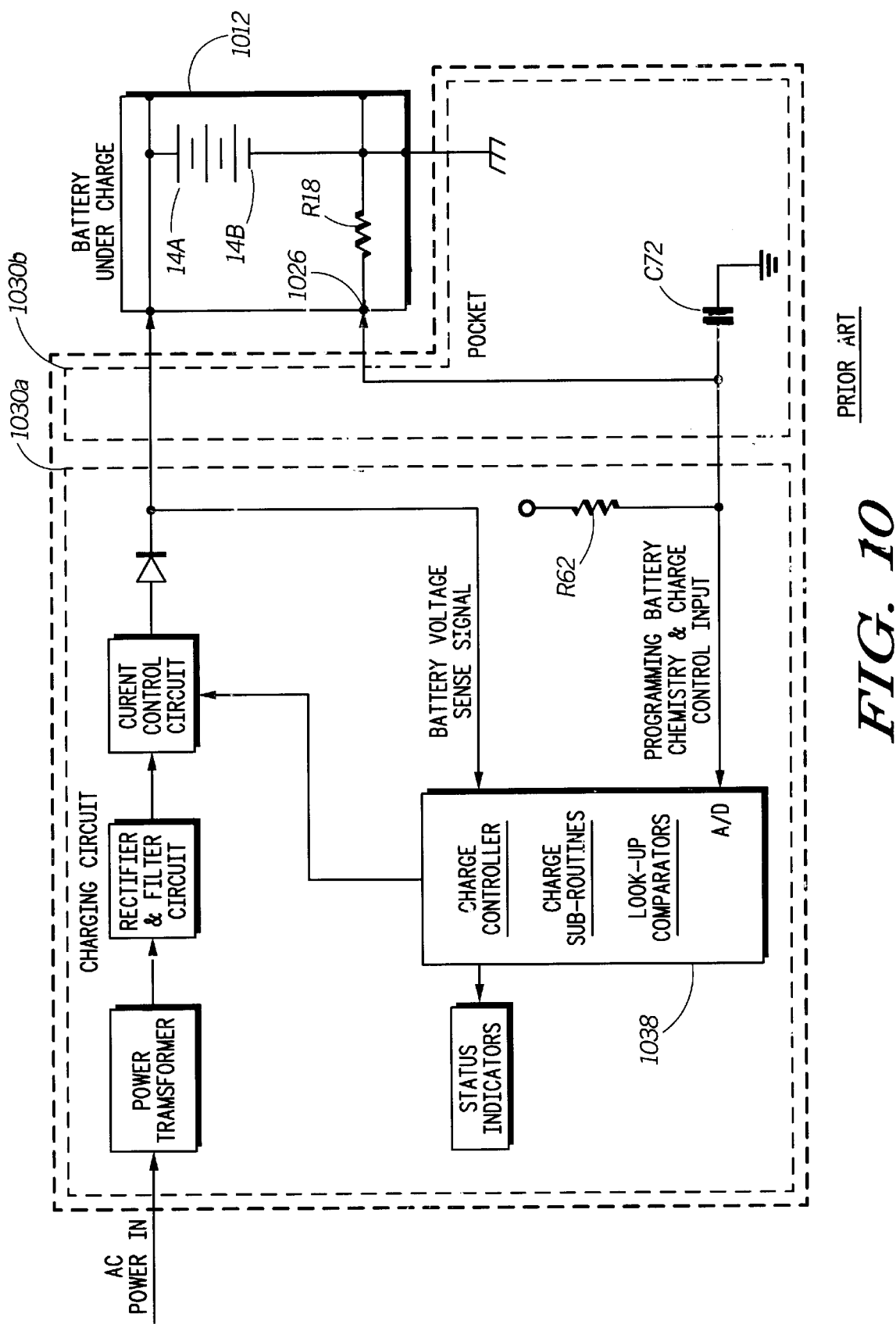
FIG. 10 is a prior art block diagram of an intelligent battery charging system.

Another prior art solution is taught in commonly assigned U.S. Pat. No. 5,184,059, issued to Patino et al., entitled "Expanded Battery Capacity Identification Scheme and Apparatus". Referring now to FIG. 10, illustrated therein is this solution. The microprocessor 1038 is either connected to or includes conventional analog-to-digital (A/D) converter functions or the like. As is known, the microprocessor 1038 is programmed to periodically measure the value of voltage connected to the A/D input. To form a charging algorithm sensing circuit, the resistor R18 is connected to the negative charger contact 1026 so that a predetermined external impedance (or voltage source) may be connected to complete a voltage divider with a pull-up resistor R62. In this manner, predetermined values of voltage at the negative charger contact 1026 can be calculated to provide one factor relating to the battery capacity. It is appreciated that the measured voltage Vm is directly related to the resistance of the connected resistor R18 in accordance with the usual voltage divider relationship:

$$Vm = (B^+)R18/(R62+R18). \qquad \text{[equation 1]}$$

where

Vm equals the measured voltage at the negative battery charger contact 1026 or the A/D input(line);

$B^+$=the supply voltage (i.e. as may have also just previously been measured with the aid of the A/D converter) at the A/D input;

R62 equals the known pull-up resistance internal to the charging circuit 1030a;

R18 equals the unknown resistance, not necessarily associated uniquely with a particular capacity. After solving for the resistance of R18, one factor relating to the battery capacity can thus be determined.

The Patino et al. solution utilizes a capacitor to expand the present capability of battery capacity sensing and to allow for radio family type differentiation. This is accomplished by utilizing the non-ideal presently coded resistor implementation and a coded capacitor C72 within the charger pocket 1030b. The coded capacitor C72 is connected in parallel with the coded resistor R18 when the battery 1012 is inserted into the pocket 1030b. The coded capacitor C72 is uniquely coded for each radio family type, wherein a 47 uF may denote a type A radio, 27 uF may denote a type B radio, and 68 uF may denote a type C radio.

Figure 11:
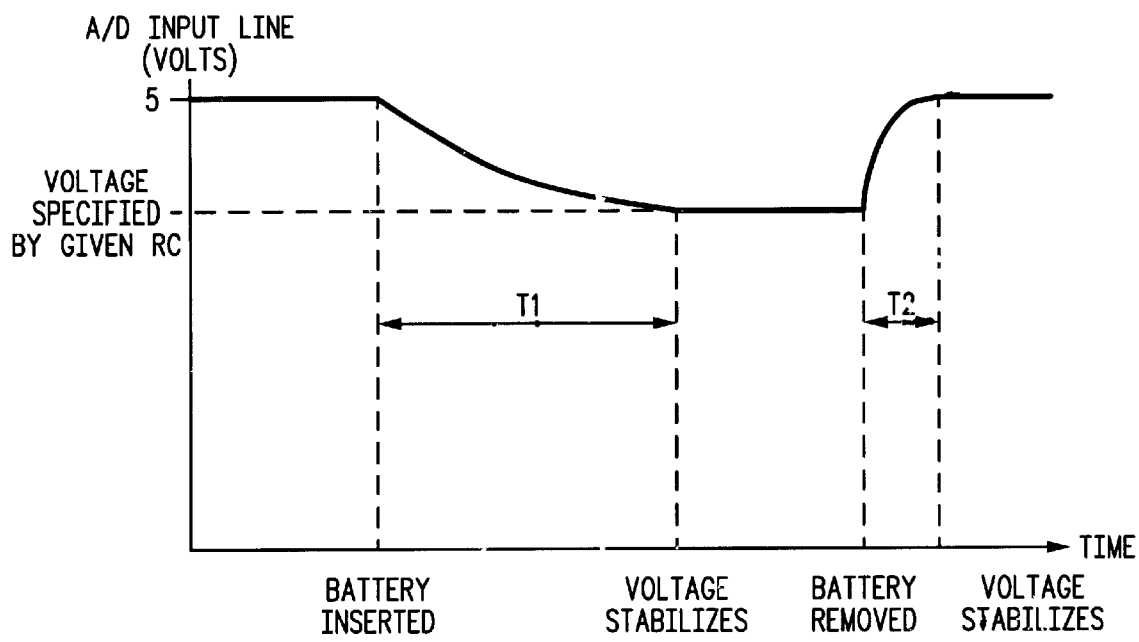
FIG. 11 is a voltage stabilization curve associated with the prior art system of FIG. 10.

Referring now to FIG. 11, a time constant T1=R18.times.C72 developed by the coded resistor R18 and capacitor C72 has to elapse before the voltage Vm is stabilized enough for the resistance of the coded resistor R18 to be measured. This time constant provides a second factor which is also related to the battery capacity, aside from relating to the radio family type. From determining the time constant alone or in combination with the resistance value of the coded resistor R18, the battery capacity and the family type of the associated radio can be identified by the microprocessor 1038 accessing its look-up table stored in memory.

The issue with the Patino et al. solution is that it requires a connection between the identifying capacitor and the resistor embedded in the battery. Additionally, this particular solution is only amenable to electronic devices and batteries having coding resistors stored therein. As coding resistors were patented until the expiration of the Bogut patent, only the patent holder and licensees were able to include such resistors in their products. Consequently, some user's phones would not work with this particular solution.

One object of the present invention is to provide an adapter cable with a universal interface as a common connector at one end but with that cable provided with a suitable connector at the other end to attach to a particular connector configured to another type of mating connector. The present invention further contemplates the creation of a plurality of pocket adapter devices, each pocket adapter device being adapted to establish a physical and electrical interconnection between a particular model of cellular telephone and a common base unit.

One object of the present invention is to provide a method of identifying a cable having a universal connector on one end and a device specific connector on the other end. The method has advantages over the prior art in that it is lower cost, offers a broader spectrum of identification and is easily incorporated into semiconductor devices. The invention includes a universal base unit that has a universal connector. Multiple cables may be provided, each having a universal connector (for mating to the universal unit) and an electronic device-specific connector for mating to an electronic device.

Figure 12:
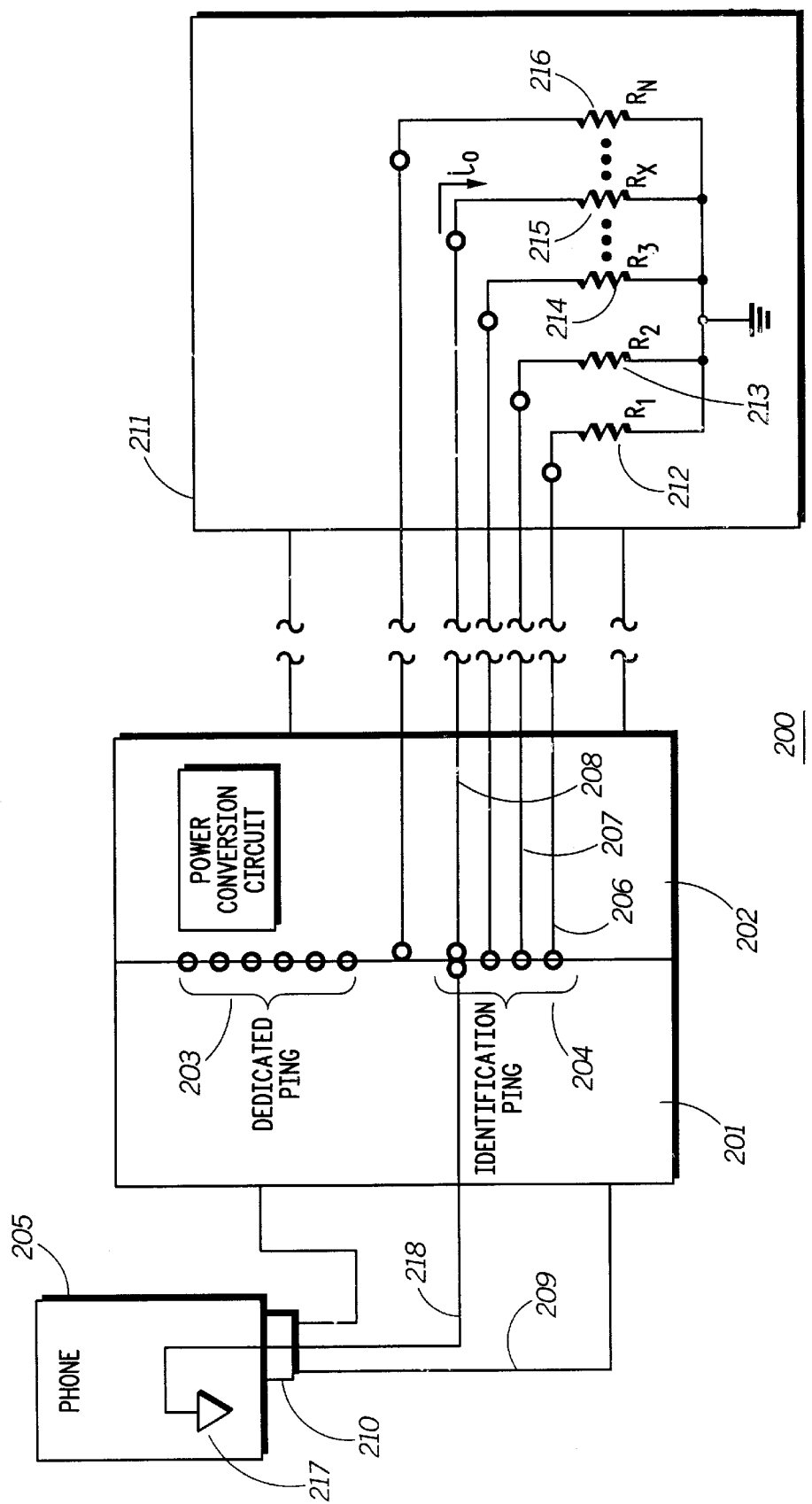
FIG. 12 is a schematic block diagram of an intelligent accessory system in accordance with the invention.

Referring now to FIG. 12, illustrated therein is a schematic block diagram in accordance with the present invention. The system 200 includes a cable 209 having a universal connector 201 at one end with dedicated pins 203 and identification pins 204. At the other end of the cable 209 is a device specific connector 210. The device specific connector 210 is configured such that the appropriate pins of the device specific connector 210 couple to the corresponding pins of the electronic device 205.

The dedicated pins 203 in the universal connector 201 are reserved for functional use in accommodating an electronic device 205. These pins include power, audio, data and other functions like those recited in FIG. 4. The identifying 204 pins are reserved for identification of the external device 205. Each pin corresponds to a unique make and model of an electronic accessory. For example, pin 206 may correspond to a Nokia telephone, pin 207 to a Panasonic phone and pin 208 to a Motorola phone. There is no limit on the number of identification pins. The only constraint is the physical size of the universal connector 201.

The universal device 211 includes a universal mating connector 202 to which the universal connector 201 couples both mechanically and electrically. Each of the identification pins 204 couples through the universal mating connector 202 to a corresponding current sense resistor 212–216 disposed in the universal device 211. In this exemplary embodiment, resistor 212 is coupled electrically to identification pin 206, identification pin 213 is coupled to identification pin 207, and so on. These current sense resistors 212–216 are then coupled to a sensing circuit (not shown). The sensing circuit may be any of the following: a microprocessor with multiple inputs; a logic device with multiple inputs; an array of comparators; an array of transistors, switches or relays; or any other circuit that is actuated by a change in voltage.

Each cable 209 is configured for a specific electronic device 205. This is best illustrated by example. Assume that the electronic device 205 is a Motorola cellular telephone. The phone 205 has an internal ground 217, or power return path. When the cable 209 is coupled to the phone 205, the cable is configured such that the ground 217 of the phone is routed via a flexible wire to the Motorola identification pin, which is this example is pin 208. When this occurs, all the current delivered by the power pin (one of the dedicated pins 203) returns through current sense resistor 215. This return current causes a voltage across resistor 215. When the voltage appears at the sensing circuit, the sensing circuit identifies the phone 205 as a Motorola model because the resistor 215 has a voltage while the other resistors 212,213, 214,216 do not. Hence the phone 205 is identified.

When one particular model of phone is coupled, the ground is routed via the manufactured configuration of the phone to the proper current sense resistor. The other resistors have no connection and are thus left floating. As the current returning from the particular phone causes a voltage to appear across only one resistor, the universal device is able to identify the particular device. The identification may be vis-+e,fra a+ee -vis a memory look-up table, embedded firmware, or logic circuitry.

In another embodiment of the invention, rather than using current sense resistors, this particular embodiment uses pull-down resistors. Rather than having low-impedance resistors coupled in series from the electrical device ground to ground in the universal device, high impedance resistors are coupled in parallel with the electrical device ground to the power rail of the universal device. Thus, when the identification pins in the universal mating connector are open, the voltage at the sensing circuit is equal to the voltage of the power rail. When the proper resistor is coupled to the ground of the electrical device, however, the side of the resistor coupled to the sensing circuit is thereby "pulled-down" to ground. By sensing the particular resistor that gets pulled down, the universal device is able to identify the particular make of the electronic device.

To recap, the invention contemplates a universal connector that includes several pins that are reserved for identification of the cable and thus the electronic device. The identification pins are coupled to either current sense or pull-down resistors. All identification pins are open, or floating, except for one pin that is coupled, via the construction of the cable, to the ground of the electronic device. By coupling one pin to the ground of the electronic device, a voltage change occurs across its corresponding resistor. A sensing circuit senses this change and thereby identifies the electronic device.

The universal device may comprise any number of forms, including having power conversion circuits. The universal device may also comprise any number of well known circuits, including a hands-free circuit, answering machine, infrared communications, computer modems, facsimile machines, scanners, bar code readers, digital information processors, fly back regulator, a step-down, or "buck", regulator, a step-up regulator, a buck-boost regulator, a resonant regulator, or similar design. In one preferred embodiment, the accessory circuit is a power conversion circuit comprising a fly back regulator capable of coupling to a wall outlet and converting AC power to DC power. In another preferred embodiment, the accessory circuit is a power conversion circuit comprising a buck regulator capable of coupling to an automotive cigarette lighter adapter.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment has included identification of cellular telephones as the host device, it is understood that the invention contemplates identification of other types of devices including pagers, radios, PDAs, laptop computers and the like.

What is claimed is:

1. An intelligent accessory system for identifying a particular electronic device, the system comprising:

a. a universal base unit having a control circuit, the control circuit having at least a first input and a second input, the universal base unit further comprising at least a first resistor and a second resistor coupled to the at least a first input and the at least a second input respectively; and b. an interface device having both a first connector capable of mechanically and electrically coupling to the universal base unit and a second connector capable of mechanically and electrically coupling to at least a first electronic device, the second connector having at least a first identification pin and at least a second identification pin, wherein the at least a first identification pin is coupled to the at least a first resistor and the at least a second identification pin is coupled to the at least a second resistor;

wherein when the interface device is coupled serially between the universal base unit and the at least a first electronic device, a voltage is created across the at least a first resistor.

2. The system of claim 1, wherein when the interface device is coupled serially between universal base unit and at least a second electronic device, a voltage is created across the at least a second resistor.

3. The system of claim 2, wherein the control circuit determines the identity of the at least a first electronic device by sensing the voltage across the at least a first resistor.

4. The system of claim 3, wherein the control circuit determines the identity of the at least a second electronic device by sensing the voltage across the at least a second resistor.

5. The system of claim 3, wherein when the at least a first electronic device is identified, the control circuit configures the universal base unit to accommodate the at least a first electronic device.

6. The system of claim 5, wherein the universal base unit further comprises a power conversion circuit.

7. The system of claim 6, wherein the power conversion circuit is selected from the group consisting of fly back regulator, a step-down, or "buck", regulator, a step-up regulator, a buck-boost regulator, and a resonant regulator.

8. A method for identifying an electronic device, the method comprising the steps of:

a. providing a universal base unit having a control circuit, at least two resistance means coupled electrically to the control circuit, the universal base unit further comprising a universal connector having at least two identification pins;

b. providing an interface means, the interface means comprising a universal mating connector and a connector of accommodating a first electronic device;

c. coupling the interface means serially between the first electronic device and the universal base unit;

d. sensing a voltage across a first of the at least two resistance means; and e. associating a set of accommodating parameters associated with the first electronic device as a result of sensing a voltage across a first of the at least two resistance means.

* * * * *